INVENTORS
E. R. DOUBEK, JR
C. W. REILEY
BY
ATTORNEY

United States Patent Office 3,359,490
Patented Dec. 19, 1967

3,359,490
SYSTEMS FOR TESTING THE TOLERANCES OF CAPACITIVE VALUES OF CAPACITORS
Edward R. Doubek, Jr., Brookfield, and Charles W. Reiley, Chicago, Ill., assignors to Western Electric Company Incorporated, New York, N.Y., a corporation of New York
Filed June 3, 1964, Ser. No. 372,219
2 Claims. (Cl. 324—60)

ABSTRACT OF THE DISCLOSURE

A testing circuit senses when an unknown capacitor does not have a value between predetermined upper and lower limits of capacitance. The circuit includes a resonant tank circuit containing the unknown capacitor and a triode connected to the resonant circuit for sensing when the circuit does not resonate. The triode is conductive when the magnitude of the signal across the tank circuit is small and nonconductive when the magnitude of the signal across the tank circuit is large.

---

This invention relates to systems for testing the tolerances of capacitive values of capacitors, and more particularly to systems for ascertaining whether unknown capacitors have capacitive values that fall within allowable variations, having upper and lower limits, from standard capacitive values.

In the manufacture of capacitors, it is necessary to determine whether capacitive values fall within finite limits. Where mass production methods are employed, it is highly advantageous to perform such a determination with a minimum expenditure of time and with testing facilities that are simple and require a minimum of adjustments. Further, it is desirable to provide simple visual indicating means to appraise an attendant that the capacitive value of a particular capacitor under test falls within the desired limits. Since frequently a plurality of capacitors having a wide range of capacitive values require such testing, it is also desirable that the testing facilities include an expedient for adjusting the limits beyond which a variation from a standard capacitive value is indicative of an unsatisfactory capacitor.

It is therefore an object of the present invention to provide new and improved systems for testing the tolerance of capacitive values of capacitors.

Another object of the invention is the provision of a system for ascertaining whether an unknown capacitor has a capacitive value that falls within allowable variations, having upper and lower limits, from a standard capacitive value.

A still further object of the invention is to provide systems for testing the tolerances of a plurality of capacitors having a wide range of capacitive values by adjusting the tolerance limits beyond which a variation from a standard capacitive value is not allowable.

With these and other objects in view, the present invention contemplates a system for testing the tolerances of capacitive value of an unknown capacitor. The system includes an oscillator for producing a signal of constant frequency, the output of which is connected across a series combination of a tank circuit and a variable capacitor. The variable capacitor enables an attendant to adjust the upper and lower tolerance limits which the unknown capacitor must fall within to be acceptable. The tank circuit includes in a branch thereof an inductor capable of resonating at the output frequency of the oscillator with a known capacitor having a standard capacitive value. Connected across such inductor is the unknown capacitor which resonates with the inductor if the capacitive value of the unknown capacitor falls within the upper and the lower tolerance limits.

Figure 1:
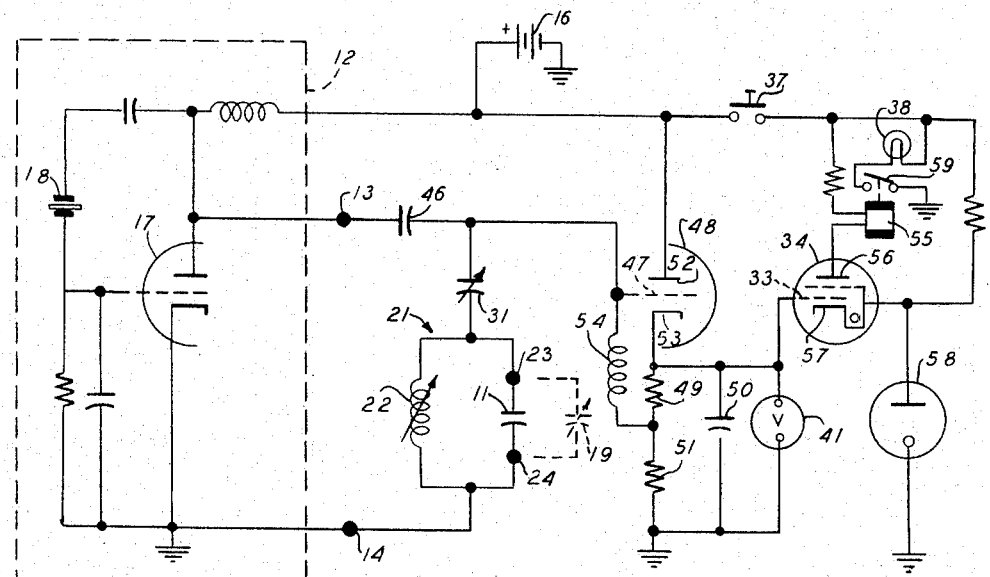
Figure 2:
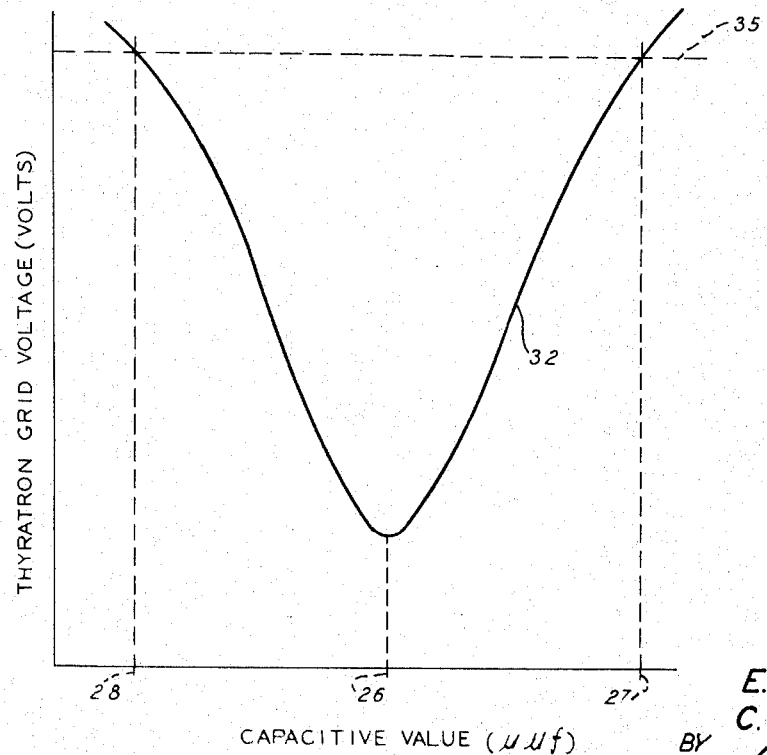

Other objects and advantages of the present invention will become apparent from the following detailed description and the accompanying drawing, wherein:

FIG. 1 illustrates a system for testing the tolerance of capacitive value of an unknown capacitor; and FIG. 2 is a graphical representation of the voltage applied to the control grid of a thyratron versus the capacitive value of the unknown capacitor, showing the allowable deviations, having upper and lower limits, from the capacitive value of a standard capacitor.

Referring now to the drawing, there is shown a system for testing the tolerance of capacitive value of an unknown capacitor 11. The system includes an oscillator 12 for producing an output voltage of substantially constant frequency and amplitude at a pair of output terminals 13 and 14, one of which is grounded. In the usual manner, the oscillator 12 is supplied by a DC source 16 and includes a triode 17 and a crystal 18 for controlling the frequency of such oscillator 12. The oscillator 12 may be any conventional type of oscillator capable of producing an output voltage of substantially constant frequency and amplitude, such as, for example, a Pierce oscillator (shown and described on pages 143–146 of The Radio Amateur's Handbook, 1963, published by the American Radio Relay League, West Hartford, Conn.).

Before the unknown capacitor 11 is connected within the system for tolerance testing, it is necessary to effectuate preliminary adjustments.

More particularly, in effectuating these adjustments, a standard variable capacitor 19, shown in dashed lines in FIG. 1, is connected within a tank circuit, generally designated by the numeral 21, in parallel with a variable inductor 22 by connecting such capacitor 19 to the terminals 23 and 24 of the tank circuit 21. The standard variable capacitor 19 is first adjusted so that its capacitive value, shown in FIG. 2, by a graduation mark 26, is midway in a range of capacitive values represented by an adjustable upper limit, shown by a graduation mark 27, and an adjustable lower limit, shown by another graduation mark 28. For the unknown capacitor 11 to be acceptable as a result of the tolerance testing, its capacitive value must fall within this range of capacitive values.

Moreover, with the standard variable capacitor 19 connected in the tank circuit 21 and adjusted at its midway capacitive value, the inductive value of the inductance 22 as well as the parameters of the oscillator 12 and crystal frequency thereof are selected and/or adjusted so that the tank circuit 21 achieves parallel resonance at the output frequency of the oscillator 12 and at the midway capacitance value of the capacitor 19.

Further, while the standard variable capacitor 19 is still connected within the tank 21 and adjusted at its midway capacitive value, a variable capacitor 31 is adjusted to establish the upper limit represented by the mark 27 and the lower limit represented by the mark 28. Effectively, such adjustment determines the shape of a curve 32 of voltage applied to a control grid 33 of a thyratron 34 versus the capacitive value of the unknown capacitor 11, thereby determining where such curve 32 crosses the critical voltage of the thyratron 34. This critical voltage is represented in FIG. 2 by a line 35.

In carrying out the limit adjustment, the variable capacitor 31 is adjusted to reduce its capacitive reactance to a minimum. Then, the standard variable capacitor 19 is adjusted to increase its capacitance to establish the upper limit of capacitance, shown by mark 27, FIG. 2. Next, a normally open push-button switch 37 is depressed and held closed to condition the thyratron 33 for firing and the lamp 38 for energization. Then, the capacitor 31 is again adjusted, but this time to increase its capacitive reactance, resulting in moving both ends of the curve 32 closer together, to thereby obtain that adjustment of the capacitor 31 where the thyratron 34 is just fired and the lamp 38 is just energized. This adjustment of capacitive value of capacitor 31 establishes the upper limit represented by mark 27. Upon establishing the upper limit, the push-button switch 37 is released to shut off the thyratron 34 and de-energize the lamp 38.

The establishing of the upper limit represented by the mark 27 approximately establishes the lower limit represented by the mark 28; no separate adjustment is necessary to establish this lower limit.

Now that the upper and lower limits represented by marks 27 and 28 have been established, the standard variable capacitor 19 is removed from the tank circuit 21. Then, the unknown capacitor 11 is connected to terminals 23 and 24 of the tank circuit 21 in place of the standard capacitor 19.

After the unknown capacitor 11 has been connected in the tank circuit 21, the push-button switch 37 is again depressed and held in this condition to initiate the testing operation by again conditioning thyratron 34 for firing and an indicating lamp 38 for energization. With the capacitor 11 connected into the tank circuit 21, two test possibilities may occur: first, the capacitive value of the unknown capacitor 11 may fall within the desired range, represented by marks 27 and 28; or second, such capacitive value may not fall within this range.

It is first assumed that the unknown capacitor 11, the tolerance of which is to be tested, has a satisfactory value of capacitance which falls within the desired range, represented by marks 27 and 28. Under this condition, the output voltage of the oscillator 12 drops across a fixed capacitor 46, the variable capacitor 31 and the tank circuit 21 to produce parallel resonance in the tank circuit 21 or a condition proximately approaching such resonance.

At resonance, the impedance of the tank 21 is maximum and the voltage drop across the series combination of the tank circuit 21 and the variable capacitor 31 is therefore also maximum. This maximum voltage is fed to a grid 47 of a triode 48. Since the load of the triode 48 is highly capacitive due to a capacitor 50, the voltage across a pair of cathode resistors 49 and 51 cannot undergo an instantaneous change. Consequently, the plate current of the triode 48 is turned off for a part of the input voltage. Moreover, the larger the amplitude of this input voltage, the smaller is the conduction angle of triode 48; therefore, the smaller the voltage across the resistors 49 and 51. Thus, with the maximum voltage fed to the triode 48, the voltage across the resistors 49 and 51 is a minimum.

To prevent the RF part of the signal fed to the grid 47 from being drained to ground through the resistor 51, while at the same time permitting DC produced by rectification between the grid 47 and cathode 53 to be drained to ground through the resistor 51, a choke 54 is connected from the grid 47 to the junction of the resistors 49 and 51.

The minimum voltage produced by the maxium input voltage at the grid 47 appears across the resistors 49 and 51 and is shown by the curve 32 at the mark 26. This minimum voltage is directed to the control grid 33 of the thyratron 34. Such voltage at the control grid 33 of the thyratron 34 is substantially below the critical voltage, represented by the line 35, of the thyratron 32, as clearly shown in FIG. 2, resulting in the maintaining of the thyratron 34 in its shut-off condition. Consequently, a relay 55 connected in the circuit of the plate 56 and cathode 57 of the thyratron 34, is maintained in its unoperated condition, resulting in the maintaining of the lamp 38 in its de-energized state.

The maintaining of the lamp 38 in its de-energized state indicates that the unknown capacitor 11 has a capacitive value that falls within the range of capacitive values represented by the marks 27 and 28 on FIG. 2.

It is now assumed that the unknown capacitor 11 does not have a satisfactory value of capacitance. That is, the value of capacitance of the unknown capacitor 11 does not fall within the range represented by marks 27 and 28 on FIG. 2. Due to this condition, the tank circuit 21 is is not in its resonate state. As a result, the voltage applied to the grid 47 of the triode 48 is considerably less than maximum and the voltage drop across the cathode resistors 49 and 51 is greatly increased. Thus, the voltage applied to the control grid 33 greatly exceeds the critical voltage, represented by the line, 35, of the thyratron 34. Therefore, the thyratron 34 fires, producing a current from cathode 57 to plate 56 to energize the relay 55 over a path including ground, a voltage regulator 58, cathode 57, plate 56, relay 55, now closed switch 37, and source 16.

Operation of the relay 55 energizes the lamp 38 over a path including ground, now closed contacts 59 of now operated relay 55, lamp 38, now closed switch 37, and source 16.

Energization of the lamp 38 indicates that the unknown capacitor 11 has a capacitive value which does not fall within the desired range, represented by marks 27 and 28, and is therefore faulty and not acceptable. Such faulty capacitor 11 may result from an open or short circuit in the capacitor 11 or from the capacitor 11 not having proper capacitive value.

Since the unknown capacitor 11 has been tested, the switch 37 is released to open the circuit of the plate 56 and cathode 57 of the thyratron 34, to shut off such thyratron 34 and to release the relay 55 to thereby de-energize the lamp 38. This conditions the system of FIG. 1 for testing another unknown capacitor 11.

The testing system of FIG. 1 offers a high-speed testing system with adjustable tolerance limits which can be changed very easily to accommodate the testing system for a variety of unknown capacitors having a wide range of capacitive values.

It is to be understood that the above-described embodiment of the invention is simply illustrative and that numerous modifications may be made within the spirit and scope of the invention.

What is claimed is:

1. In a system for ascertaining whether the capacitive value of an unknown capacitor is within upper and lower limits of capacitance,
    an oscillator having a pair of output terminals for producing an output signal of constant amplitude and frequency at said output terminals, one of said terminals being connected to ground;
    a fixed capacitor having one end thereof connected to the other of said output terminals of said oscillator;
    a variable capacitor having one end thereof connected to the other end of the fixed capacitor for establishing the upper and lower limits;
    a tank circuit having one end thereof grounded and the other end thereof connected to the other end of the variable capacitor and including an inductor and the unknown capacitor connected across the inductor, such tank circuit being resonant at the output frequency of the oscillator if the capacitive value of said unknown capacitor is between the upper and lower limits of capacitance;
    a pair of serially interconnected cathode resistors having one end thereof grounded;
    a choke connected to the interconnecting junction of the cathode resistors and to the interconnecting junction of the fixed capacitor and the variable capacitor;
    a DC power supply having the negative terminal thereof connected to ground;
    a triode having an anode, a cathode and a grid, the grid being connected to the interconnecting junction of the choke, the fixed capacitor, and the variable capacitor, the cathode thereof being connected to the other end of the pair of cathode resistors, the anode thereof being connected to the positive terminal of the DC power supply, such triode being rendered conductive by the failing of the tank circuit to resonate;

a bias capacitor connected between the cathode of the triode and ground;

a relay having one end thereof connected to the positive terminal of the power supply and including normally open contacts, one of which is connected to ground;

a lamp having one end of the filament thereof connected to the other contact and the other end of the filament thereof connected to the positive terminal of the power supply;

a voltage regulator having an anode and a cathode, the cathode thereof being connected to ground and the anode thereof being connected by third resistor to the positive terminal of the power supply for providing a stable bias voltage; and a thyratron having an anode, a cathode, and a control grid, the anode thereof being connected to the other end of the relay, the control grid thereof being connected to the interconnecting junction of the cathode of the triode, the bias capacitor and said other end of the pair of cathode resistors, the cathode thereof being connected to the anode of the voltage regulator, such thyratron being fired by the conduction of the triode to operate the relay to close the contacts thereof to connect said source of power to the lamp to energize said lamp to indicate that the capacitive value of the unknown capacitor is not within the limits.

2. In a system for ascertaining if the value of an unknown capacitor fails to be between upper and lower limits of capacitance, an oscillator for producing an output signal of constant amplitude and frequency;

a resonant circuit connected across the output of the oscillator; said resonant circuit including (1) a parallel combination of an inductor and the unknown capacitor and (2) a variable capacitor connected in series with the parallel combination; said resonant circuit being resonant at the output frequency of the oscillator if the unknown capacitor has a value between upper and lower limits of capacitance; said variable capacitor determining the magnitude of the signal produced across the resonant circuit at its resonant frequency;

a triode having a grid, an anode and a cathode, said grid connected to one end of the resonant circuit;

a pair of resistors serially connected between the cathode and the other end of the resonant circuit;

a bias capacitor connected between the cathode and the other end of the resonant circuit;

a choke inductor connected between the grid and the junction between the pair of resistors;

means for applying a voltage to the anode such that the triode is conductive except when negative portions of the voltage across the resonant circuit exceed a predetermined magnitude; and means connected across the bias capacitor for sensing when the voltage across the bias capacitor exceeds a predetermined voltage to indicate that the unknown capacitor does not have a value between the upper and lower limits of capacitance.

References Cited
UNITED STATES PATENTS

| | | | |
|---|---|---|---|
| 1,867,131 | 7/1932 | Bennett | 324—60 |
| 2,071,607 | 2/1937 | Bjorndal | 324—60 X |
| 2,509,401 | 5/1950 | Scheiner | 324—57 |
| 2,588,882 | 3/1952 | Rolfson | 324—61 |
| 2,617,859 | 11/1952 | Kraft | 324—60 |
| 2,626,981 | 1/1953 | Shipe | 324—57 |
| 2,627,539 | 2/1953 | Tomkins | 324—57 |

FOREIGN PATENTS 629,723   9/1949   Great Britain.

RUDOLPH V. ROLINEC, *Primary Examiner.*

E. E. KUBASIEWICZ, *Assistant Examiner.*